Jan. 10, 1928.
H. E. KEMPTON
GAUGE
Filed July 27, 1923
1,655,905
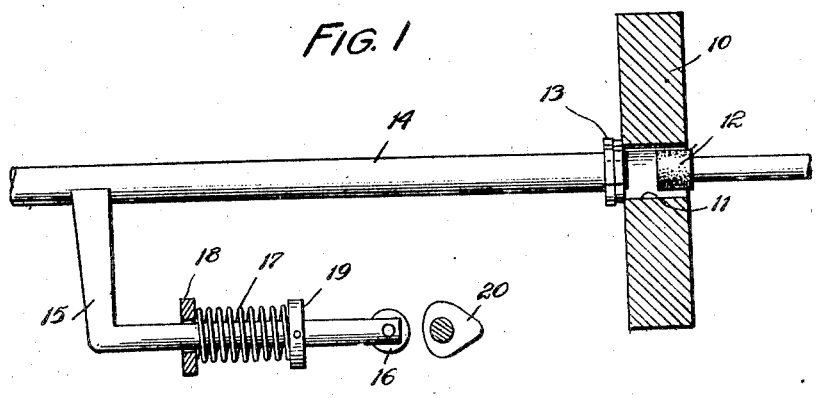
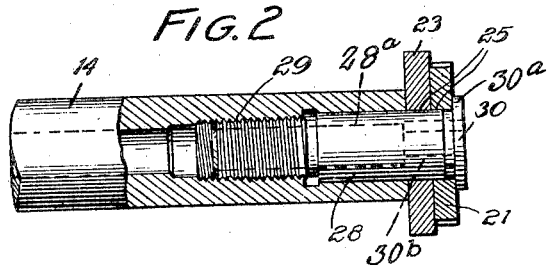
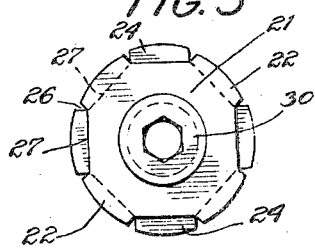
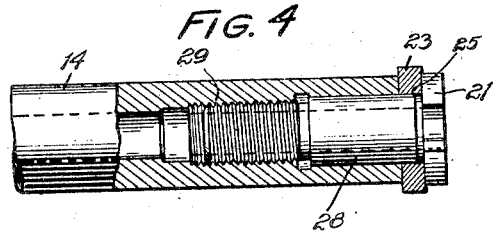
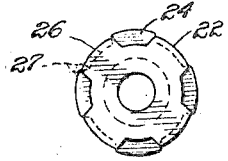
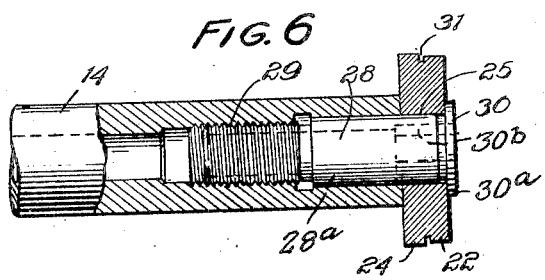
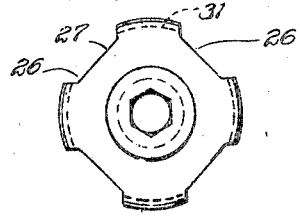
Inventor
Herbert E. Kempton
By Churchill Parker Carlson
Attys Patented Jan. 10, 1928.

1,655,905

UNITED STATES PATENT OFFICE.

HERBERT E. KEMPTON, OF FOND DU LAC, WISCONSIN, ASSIGNOR, BY MESNE ASSIGNMENTS, TO THE HEALD MACHINE COMPANY, OF WORCESTER, MASSACHUSETTS, A CORPORATION OF MASSACHUSETTS.

GAUGE.

Application filed July 27, 1923. Serial No. 654,057.

The invention relates to improvements in gauges for use in metal removing operation, and has particular reference to a gauge member adapted to be used in an internal grinding machine of the character disclosed in a copending application, Serial No. 620,604 filed February 23, 1923 by Prentice Conradson, Herbert E. Kempton and Keith F. Gallimore.

In grinding machines of the above character, a reciprocating grinding element passes back and forth through the bore of a revolving work blank, and a gauge member comprising a set of coarse feed gauge points and a set of fine feed gauge points automatically and periodically attempts to enter the bore of the work blank after each withdrawal of the grinding wheel. When the grinding operation has proceeded to a predetermined point, the coarse feed gauge points enter the bore, whereupon means is actuated for reducing the rate of cross feed. Upon the completion of the grinding operation, the fine feed points enter the work, whereby the cross feed is discontinued and the grinding wheel is permanently withdrawn.

The primary object of the invention is to provide a gauge member of improved construction and form, and improved means for mounting or supporting said member.

A further object is to provide a sturdy gauge member which can be easily and quickly assembled and disassembled, and which is extremely accurate and efficient in operation.

Further objects and advantages will become apparent as the description proceeds.

Referring to the drawings, Fig. 1 is a diagrammatic view showing a gauge member embodying the features of my invention in operative relation to a work blank being ground.

Fig. 2 is a sectional view of separate roughing and finishing gauges mounted in position on a gauge rod.

Fig. 3 is an end view of the gauge member shown in Fig. 2.

Fig. 4 is a sectional view of a modified form of gauge member showing the roughing gauge formed integral with the gauge screw.

Fig. 5 is an end view of the gauge member shown in Fig. 4.

Fig. 6 is a sectional view of another modification showing the roughing and finishing gauges combined in one piece and mounted on the gauge rod.

Fig. 7 is an end view of the gauge member shown in Fig. 6.

While the invention is susceptible of various modifications and alternative constructions, I have illustrated in the drawings and will herein describe in detail the preferred embodiment, but it should be understood that I do not thereby intend to limit the invention to such construction, but aim in the subjoined claims to cover all legitimate modifications and alternative constructions falling within the scope of the invention.

In the drawings, 10 represents a work blank having an internal bore 11 which is being ground by a reciprocable grinding element 12, and 13 indicates a gauge member mounted on a gauge rod 14 for reciprocable movement toward and from the work blank 10. Any suitable means may be employed for reciprocating the gauge rod 14 in synchronism with the grinding element 12 to bring the gauge member 13 repeatedly against the work blank 10 in an attempt to enter the bore 11 as the grinding element is withdrawn. I have herein shown the gauge rod 14 formed with an arm 15 carrying a roller 16 at its forward end. The gauge member 13 is resiliently forced toward the work blank 10 by coil spring 17 surrounding the arm 15 and abutting at one end against a fixed stop 18 and at the other end against a stop 19 rigidly secured to the arm 15, and is periodically moved out of engagement with the work blank 10 by a revolving cam 20 adapted to engage the roller 16. The cam may be actuated in synchronism with the reciprocation of the grinding element by any suitable means (not shown).

The gauge member 13 comprises a roughing gauge 21 having coarse feed gauge points 22, and a finishing gauge 23 having fine feed gauge points 24, the roughing gauge 21 being the smaller in size so as to first enter the bore 11 of the work being ground. Preferably each gauge is made in the form of a flat plate or disk with the gauge points at its periphery and with a central bore 25.

I have shown each gauge disk provided with four gauge points equally placed around the periphery, but any other suitable number of points spaced in any other desirable manner may be employed. Each gauge point is preferably formed with an arcuate outer edge having its center of curvature at the center of the gauge. The gauge points of each gauge are positioned at equal distances from the center of the gauge, and are separated by notches or depressions 26 which may be of any desired form. Thus, the depressions 26 may be formed with concave, convex or straight inner edges, as is illustrated respectively in Figures 3, 5 and 7 at 27.

The gauges 21 and 23 are rigidly secured to the end of the gauge rod 14 by means of a gauge screw 28 upon which they are mounted and which is threaded into a bore 29 in the end of the rod. Fig. 2 shows separately constructed gauges 21 and 23 mounted side by side on the screw 28 whereon they are retained by a plug 30, the roughing gauge 21 being positioned at the outer end. In the present instance the plug 30 comprises an annular radial flange 30$^a$ fitting against the outer face of the gauge 21, and a hollow cylindrical sleeve 30$^b$ fitting snugly into the enlarged forward end of a bore 28$^a$ extending through the screw 28. The bore 28$^a$ constitutes part of a coolant passage extending through the rod 14 and the plug 30. The two gauges are so positioned that the gauge points on one register with the depressions 26 on the other, whereby the points 22 and 24 are alternately arranged about the periphery of the gauge member.

In Fig. 4 the roughing gauge 21 is combined with the gauge screw 28, and a separate finishing gauge 23 is removably mounted on the screw 28 and is held between the gauge 21 and the gauge rod 14. Fig. 6 shows the roughing and finishing gauges combined in one piece in which the coarse feed points and the fine feed points are separated by grooves 31 in the periphery. In the combined form the points 22 and 24 are not alternated, but are formed in alinement.

In the grinding operation, the grinding element 12 reciprocates through the bore 11, and the gauge rod 14 under the force of the spring 17, periodically moves the gauge member 13 against the work 10. When the bore 11 has been ground to a predetermined diameter, the roughing gauge 21 enters the bore and in so doing actuates means (not shown) for reducing the relative cross feed between the work 10 and the grinding element 12. When the bore 11 has been ground to the desired size, the finishing gauge 23 finally enters the bore and thereby effects a discontinuation of the grinding operation by means (not shown).

It will be seen that the gauge device can be easily and quickly assembled, and can be changed for grinding different sized bores at different speeds. The device is simple and sturdy, and operates with extreme accuracy and efficiency.

I claim as my invention:

1. A gauge member having, in combination, a supporting rod, a screw threaded into the end of said rod, a pair of gauge disks mounted on said screw, each disk having a plurality of gauge points spaced about its periphery, and means for retaining said disks on said screw and against the end of the rod.

2. A gauge member having, in combination, a support, a screw carried by said support, and a pair of interchangeable gauge disks mounted side by side on said screw, each disk having a plurality of gauge points spaced about its periphery.

3. A gauge member comprising centrally apertured disk means adapted to be removably mounted on a support, said disk means having a plurality of spaced projections in two parallel planes to constitute two sets of gauge points, the projections in one plane being substantially less in length than the projections in the other plane.

4. A gauge member having, in combination, a support, and gauging means on said support comprising a plurality of spaced coarse feed gauge points and a plurality of spaced fine feed gauge points, said coarse feed and fine feed points being in different planes and being alternately arranged.

5. A gauge member having, in combination, a supporting rod, a screw removably secured to the end of said rod, and gauging means comprising coarse feed and fine feed gauge points mounted on said screw.

6. A gauge member having, in combination, a hollow supporting rod, a hollow screw threaded into one end of said rod, a pair of separate gauge disks mounted side by side on said screw and abutting against said end of said rod, said disks having a plurality of gauge points spaced about their periphery, and an apertured plug fitting into the outer end of said screw for retaining said disks on said screw and against the end of said rod.

7. A gauge member having, in combination, a hollow supporting rod, a screw having threaded engagement with one end of said rod, said screw having a longitudinal passage in communication with the interior of said rod, and a gauge means mounted on said screw, said gauge means comprising two sets of gauge points located in parallel planes.

8. A gauge member comprising disk means having a plurality of alternate projections and depressions, said projections constituting gauge points and portions of said projections and depressions being in different planes, with the projections of one portion arranged in registration with the depressions of another portion.

9. A gauge member comprising, in combination, a pair of disks having a plurality of alternate projections and depressions, said projections constituting gauge points, said disks being arranged side by side in axial alinement, with the projections and depressions on one disk registering respectively with the depressions and projections on the other disk, and means for supporting said disks.

10. A gauge member comprising, in combination, a support, a screw having a threaded connection with one end of said support, a gauge means carried by said screw, said means comprising two sets of points arranged in parallel planes, the gauge points in one plane being substantially less in radial length than the gauge points in the other plane.

In testimony whereof, I have hereunto affixed my signature.

HERBERT E. KEMPTON.